(12) United States Patent
Tong et al.

(10) Patent No.: US 12,416,827 B2
(45) Date of Patent: Sep. 16, 2025

(54) BACKLIGHT MODULE COMPRISING A CONDUCTIVE SHEET TO FORM AN ELECTRIC FIELD FOR ATTRACTING FOREIGN MATTER AND DISPLAY DEVICE

(71) Applicant: HKC CORPORATION LIMITED, Shenzhen (CN)

(72) Inventors: Xiaolan Tong, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/348,339

(22) Filed: Jul. 6, 2023

(65) Prior Publication Data
US 2024/0053628 A1 Feb. 15, 2024

(30) Foreign Application Priority Data

Aug. 9, 2022 (CN) .......................... 202210949820.X

(51) Int. Cl.
*G02F 1/1333* (2006.01)
*F21V 8/00* (2006.01)
*G02F 1/13357* (2006.01)
*G02F 1/1345* (2006.01)

(52) U.S. Cl.
CPC ..... *G02F 1/133314* (2021.01); *G02B 6/0083* (2013.01); *G02F 1/133311* (2021.01); *G02F 1/133608* (2013.01); *G02F 1/133615* (2013.01); *G02F 1/13452* (2013.01)

(58) Field of Classification Search
CPC ......... G02F 1/133311; G02F 1/133334; G02F 2202/16; B08B 6/00
See application file for complete search history.

(56) References Cited

U.S. PATENT DOCUMENTS

| | | | |
|---|---|---|---|
| 2008/0006296 A1 | 1/2008 | Nagata et al. | |
| 2009/0256796 A1* | 10/2009 | Jang | G02F 1/133308 349/190 |
| 2016/0306104 A1* | 10/2016 | Hsieh | G02B 6/0088 |

FOREIGN PATENT DOCUMENTS

| | | | | |
|---|---|---|---|---|
| CN | 108924300 A | | 11/2018 | |
| CN | 111965899 A | * | 11/2020 | ....... G02F 1/133308 |
| CN | 114162040 A | * | 3/2022 | |
| CN | 217082357 U | | 7/2022 | |
| JP | 2013140282 A | | 7/2013 | |

* cited by examiner

*Primary Examiner* — Paul C Lee
(74) *Attorney, Agent, or Firm* — Franklin & Associates International Inc; Matthew F. Lambrinos

(57) ABSTRACT

Disclosed are a backlight module and a display device. The backlight module comprises a backplane and a plastic frame provided around the side walls of the backplane. Two side opposite walls of the backplane or the plastic frame are respectively provided with conductive sheets insulated from the backplane, so as to form an electric field for attracting foreign matter between the two conductive sheets. The backlight module can continuously and stably absorb dust and other foreign matter during assembly and use, avoiding foreign matter from scratching optical assemblies, ensuring the stability of the display image quality of the display device, and improving product yield.

14 Claims, 7 Drawing Sheets

BACKLIGHT MODULE COMPRISING A CONDUCTIVE SHEET TO FORM AN ELECTRIC FIELD FOR ATTRACTING FOREIGN MATTER AND DISPLAY DEVICE

CROSS REFERENCE TO RELATED APPLICATIONS

This disclosure claims all the benefits of the Chinese patent application No. 202210949820.X filed on Aug. 9, 2022 before the China National Intellectual Property Administration of the People's Republic of China, entitled "backlight module and display device".

FIELD

The present disclosure relates to the field of display technology, in particular to a backlight module and a display device.

BACKGROUND

The liquid crystal display device mainly comprises a liquid crystal display (LCD) and a backlight module, the backlight module mainly comprises a backplane, a plastic frame, an optical film and an LED light source. During the assembly process of the backlight module, due to static electricity or the assembly process foreign matter such as dust attached to the optical film, the foreign matter will cause the film to be scratched during transportation, which will cause poor display such as bright spots, white spots, and black spots on the display, greatly affecting production yield.

SUMMARY

The purpose of the present disclosure is to provide a backlight module and a display device, which can continuously and stably absorb foreign matter such as dust during assembly and use, so as to ensure the display stability of the display device and improve the product yield.

In a first aspect, an embodiment of the present disclosure proposes a backlight module, comprising a backplane and a plastic frame provided around a side wall of the backplane, wherein two sidewalls opposite to the backplane or the plastic frame are respectively provided with a conductive sheet insulated from the backplane to form an electric field for attracting foreign matter between two conductive sheets.

In a second aspect, an embodiment of the present disclosure further proposes a display device, comprising: a liquid crystal display panel; and the aforementioned backlight module provided on the backlight side of the liquid crystal display for providing a light source to the liquid crystal display panel.

In a backlight module and a display device provided by an embodiment of the present disclosure, the backlight module is provided with conductive sheets insulated from the backplane on two side walls opposite to the backplane, so as to form an electric field that absorbs foreign matter between the two conductive sheets, which can continuously and stably absorb foreign matter such as dust during assembly and use, avoiding foreign matter from scratching optical assemblies, ensuring the stability of the display quality of the display device, and improving product yield.

BRIEF DESCRIPTION OF THE DRAWINGS

The features, advantages, and technical effects of the exemplary embodiments of the present disclosure will be described below with reference to the accompanying drawings. In the figures, the same parts are given the same reference numerals. The attached drawings are not drawn in accordance with the actual scale, and are only used to illustrate the relative positional relationship. Layer thickness of some parts is drawn in an exaggerated way for ease of understanding. The layer thickness in the attached drawing does not represent the proportional relationship of the actual layer thickness.

REFERENCE NUMERALS

Figure 1:
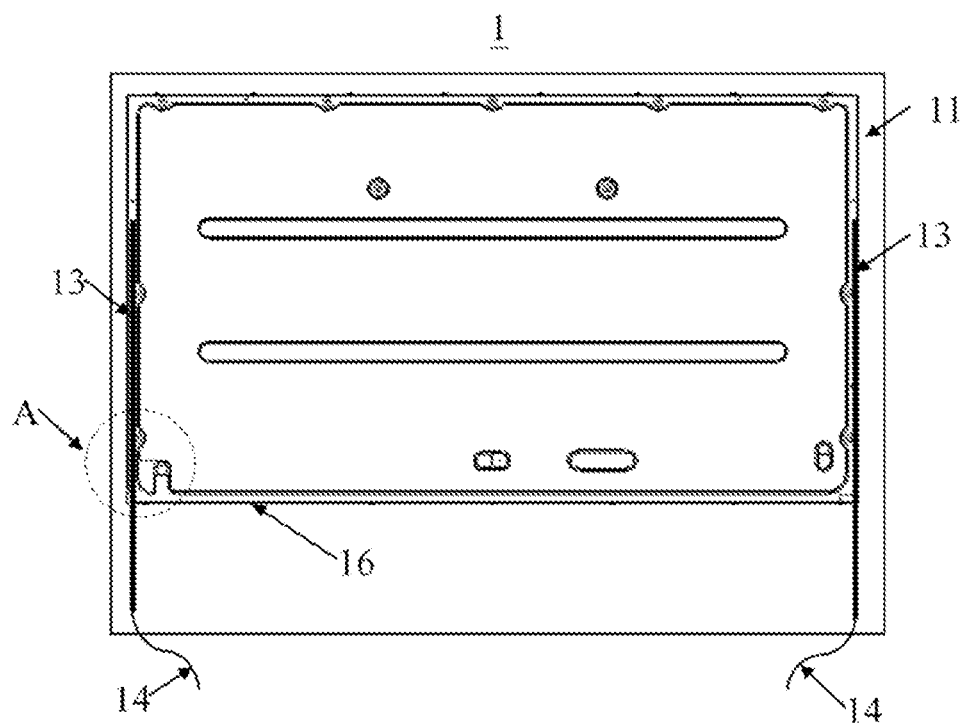
FIG. 1 shows a rear structural schematic view of a backlight module provided by a first embodiment of the present disclosure.

1. Backlight module; 11. Backplane; 111. First groove; 112. Second groove; 113. Side wall; 114. Bottom wall; H. Through hole;
12. Plastic frame; 13. Conductive sheet; 131. Insulation guide strip; 132. Storage box; O. Accommodating chamber; 1321. First storage portion; 1322. Second storage portion; 132a. First slope; 132b. Second slope; 14, Wire; 15, Insulating layer; 16, Light bar; 17, Light guiding plate; 18, Optical assembly; 19, Reflective sheet;
2. Liquid crystal display panel.

DETAILED DESCRIPTION

Features and exemplary embodiments of various aspects of the present disclosure will be described in detail below. In the following detailed description, numerous specific details are set forth in order to provide a thorough understanding of the disclosure. It will be apparent, however, to one skilled in the art that the present disclosure may be practiced without some of these specific details. The following description of the embodiments is only to provide a better understanding of the present disclosure by showing examples of the present disclosure. In the drawings and the following description, at least some well-known structures and techniques have not been shown in order to avoid unnecessarily obscuring the disclosure; and, for clarity, the dimensions of domain structures may have been exaggerated. Furthermore, the features, structures, or characteristics described hereinafter may be combined in any suitable manner in one or more embodiments.

The specific structure of the backlight module provided by various embodiments of the present disclosure and the display device comprising the backlight module will be described respectively below with reference to the accompanying drawings.

First Embodiment

Figure 2:
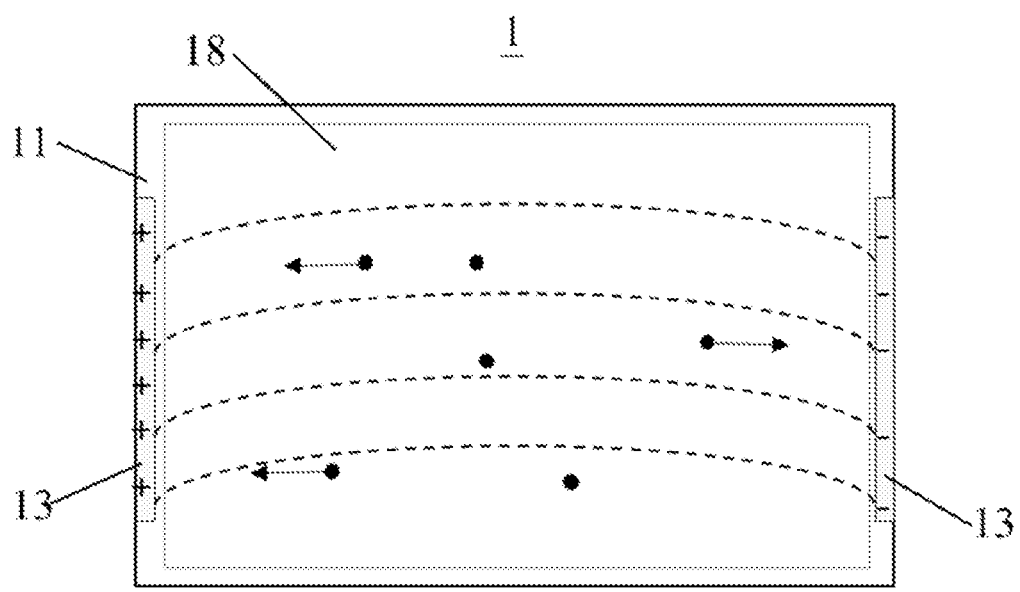
FIG. 2 shows a front top structural schematic view of the backlight module shown in FIG. 1.
Figure 3:
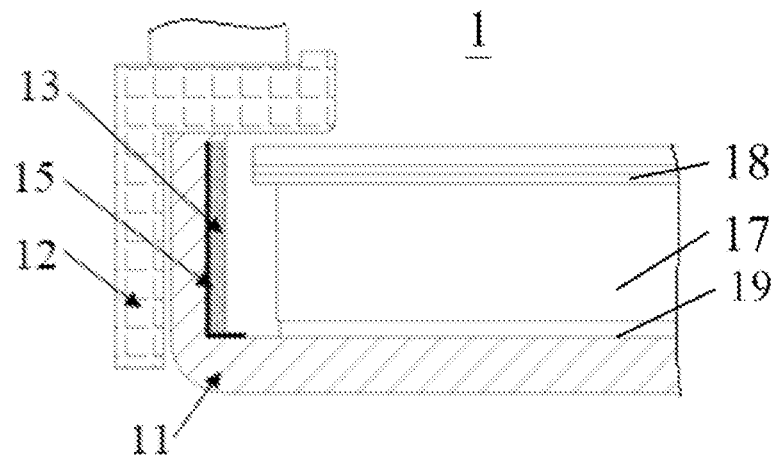
FIG. 3 shows a longitudinal cross-sectional structural schematic diagram of the backlight module shown in FIG. 1.

FIG. 1 shows a rear structural schematic diagram of a backlight module provided by a first embodiment of the present disclosure; FIG. 2 shows a front top view structural schematic diagram of the backlight module shown in FIG. 1; FIG. 3 shows a longitudinal cross-sectional structural schematic diagram of the backlight module shown in FIG. 1.

As shown in FIG. 1 to FIG. 3, the backlight module 1 provided in the first embodiment of the present disclosure is used to provide a light source to a liquid crystal display panel. The backlight module 1 comprises a backplane 11 and a plastic frame 12 provided around side walls of the backplane. Two sidewalls 113 opposite to the backplane 11 are respectively provided with a conductive sheet 13 insulated from the backplane 11, and the two conductive sheets 13 are respectively electrically connected with a power module (not shown in the figure) via wires 14 to form an electric field for attracting foreign matter between the two conductive sheets 13.

Optionally, the material of the backplane 11 is metal, such as iron-aluminum alloy, etc., which is made by stamping or other processes, so as to protect the backlight module 1 from being easily broken under the impact of external force. The material of the backplane 11 can also be plastic, such as polyimide, polycarbonate, polyethersulfone, polyethylene terephthalate, polyethylene, and the like. In addition, the shape of the backplane 11 can be the same as that of the liquid crystal display panel 2 using the backlight module 1. As shown in FIG. 1, when the shape of the liquid crystal display panel 2 is a rectangle, the shape of the backplane 11 of the backlight module 1 it uses is also a rectangle, and two conductive sheets 13 are respectively provided on the two short sides of the backplane 11.

Optionally, the conductive sheet 13 is a copper sheet with good electrical conductivity, and is insulated from the backplane 11. The power module comprises a positive terminal and a negative terminal. One conductive sheet 13 is electrically connected with the positive terminal via a wire, and the other conductive sheet 13 is electrically connected with the negative terminal via a wire. An electric field is formed between the two conductive sheets 13 when the power module supplies power. Since the backlight module 1 will inevitably produce foreign matter such as dust during assembly or use, in order to attract the foreign matter to the conductive sheet 13 via the electric field, optionally, the voltage of the electric field between the two conductive sheets 13 is below 1.2 V to form a weak electric field.

As shown in FIG. 1 and FIG. 2, the conductive sheet 13 on the left side of the backplane 11 is connected with the positive terminal of the power module, and the conductive sheet 13 on the right is connected with the negative terminal of the power module. An electric field is generated between the two conductive sheets 13 when the power module supplies power. When the outside air with dust or granular impurities passes through the electric field, the air molecules containing dust gas are ionized into positive ions and electrons in the strong electric field, the electrons will meet dust particles during the process of heading for the positive electrode conductive sheet 13 on the left, causing the dust particles negatively charged and adsorbed to the negative electrode conductive sheet 13 on the right, so as to achieve the effect of collecting impurities in the external air entering the backlight module 1.

Further, during assembly of the backlight module 1, the power module can be a test power supply. After the two conductive sheets 13 are energized, foreign matter can be adsorbed on the two conductive sheets 13. After the assembly is completed, the conductive sheet 13 can be wiped with an adhesive cotton swab, so as to minimize foreign matter inside the backlight module 1.

In addition, the power module can also be a power supply provided on the main board. After the backlight module 1 and the liquid crystal display panel are assembled into a display device product, the two conductive sheets 13 are respectively electrically connected with the power module on the main board. During use of the display device, foreign matter such as dust can be continuously and stably absorbed, preventing the foreign matter from scratching the optical assemblies, and ensuring the stability of the display quality of the display device.

In the backlight module 1 provided by an embodiment of the present disclosure, the two sidewalls 113 opposite to the backplane 11 are respectively provided with conductive sheets 13 insulated from the backplane 11, and the two conductive sheets 13 is electrically connected with the power module respectively via a wire 14 to form an electric field for absorbing foreign matter between the two conductive sheets 13, so that it can continuously and stably absorb foreign matter such as dust during assembly and use, and prevent foreign matter from scratching the optical assemblies, ensuring stability of the display image quality of the display device and improving product yield.

Figure 4:
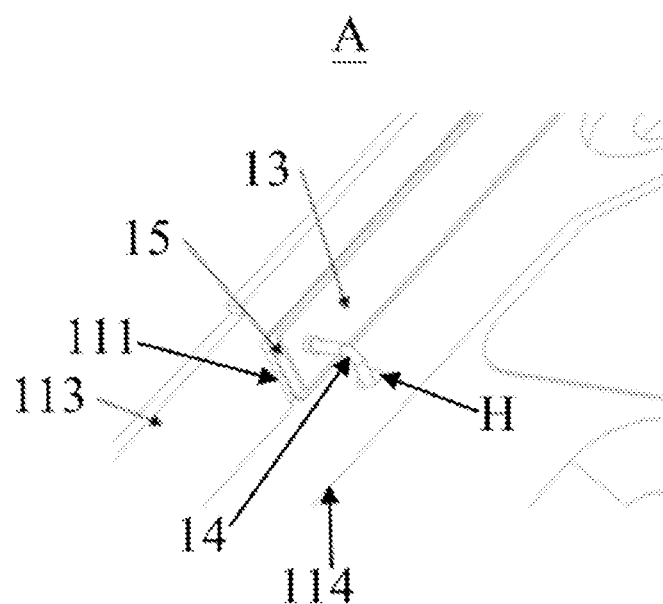
FIG. 4 shows an enlarged structural schematic diagram of area A in FIG. 1.

FIG. 4 shows an enlarged structural diagram of area A in FIG. 1.

In some embodiments, a first groove 111 is provided on the side wall 113 of the backplane 11, the conductive sheet 13 is accommodated in the first groove 111, and an insulating layer 15 is provided between the conductive sheet 13 and the first groove 111.

As shown in FIG. 4, the side wall 113 of the backplane 11 is provided with a first groove 111, optionally, the depth of the first groove 111 is 0.3 mm, the thickness of the conductive sheet 13 is 0.2 mm, and the insulating layer 15 provided between the conductive sheet 13 and the first groove 111 has a thickness of 0.1 mm. Optionally, the insulating layer 15 is an insulating tape with double-sided adhesive tape, one side of the insulating tape is bonded to the bottom of the first groove 111, and the other side is bonded to the conductive sheet 13 to prevent the conductive sheet 13 from electrically contacting with the backplane 11.

Further, the backplane 11 further comprises a bottom wall 114 connected with the side wall 113, and a through hole H is provided on the bottom wall 114 to allow the wire 14 to pass through.

As shown in FIG. 1 and FIG. 4, the conductive sheet 13 is electrically connected with the power module via the wire 14, the bottom wall 114 of the backplane 11 is provided with a through hole H that allows the wire 14 to pass through, so that the wire 14 can be hidden to the backlight side of the backlight module and be electrically connected with the power supply module on the main board of the backlight side, so that the aesthetics of the backlight module 1 will not be affected.

In some embodiments, the backlight module 1 further comprises a light guiding plate 17, a light bar 16 located on one side of the light guiding plate 17 (as shown in FIG. 1) and an optical assembly 18 located on a side away from the backplane 11 of the light guiding plate 17. The light bar 16 and the conductive sheet 13 are located on different sidewalls 113 of the backplane 11, and an orthographic projection of the conductive sheet 13 on the corresponding sidewall 113 and an orthographic projection of the optical assembly 18 on the sidewall 113 at least partially overlap.

Optionally, the backlight module 1 is an edge-type backlight module 1, and the light bar 16 is provided on one side of the light guiding plate 17, the light bar 16 comprises a circuit board and a plurality of light emitting elements provided in rows on the circuit board.

Optionally, the material of the light guiding plate 17 is polymethyl methacrylate (PMMA), polycarbonate (PC), polyethylene (PE), light guiding artificial resin and the like with high light transmittance. Light emitted from the light bar 16 enters the light guiding plate 17 from the light-incident side of the light guiding plate 17, and then enters the liquid crystal display panel 2 from the light-emitting side of the light guiding plate 17, thereby making the light bar 16 to produce point light source or converting a linear light source into a surface light source, so that the entire area of the liquid crystal display panel 2 is illuminated with substantially uniform brightness.

As shown in FIG. 1, the shape of the backlight module 1 is a rectangle, two conductive sheets 13 are respectively provided on two sides of the short side of the backplane 11, and the light bar 16 is provided on one side of the long side of the backplane 11 to prevent the conductive sheet 13 affects the light of the light bar 16. An orthographic projection of the conductive sheet 13 on the corresponding side wall 113 and an orthographic projection of the optical assembly 18 on the side wall 113 at least partially overlap, so that particles and impurities generated during the assembly or use of the optical assembly or the light bar 16 are all in the electric field, and can be adsorbed on the conductive sheet 13.

Optionally, the light-emitting element can be a light-emitting diode (LED), and the LED can be used as a self-illuminating light-emitting element for display, with low power consumption, high brightness, high resolution, high color saturation, fast response, long life, high efficiency and other advantages.

Further, the optical assembly 18 may comprise a diffuser plate and an optical film located on a side of the diffuser plate away from the backplane 11, the diffuser plate is used to diffuse the light emitted by the light-emitting elements to balance the brightness of the entire backlight module 1. The optical film may comprise, for example, a prism sheet, a protective sheet, etc. The prism sheet is used to control the propagation direction of the light diffused by the diffusion plate, so that the propagation direction of the light is perpendicular to the liquid crystal display panel 2. The protective sheet is used to protect the prisms of the prism sheet from scratches and the like. The protective sheet can also be used to widen the viewing angle that was previously narrowed by the prism sheet. The diffuser plate and the optical film are fixedly connected by transparent optical glue to prevent the relative displacement between the diffuser plate and the optical film from affecting the light emitting effect of the backlight module 1.

In addition, a reflective sheet 19 is further provided between the light guiding plate 17 and the backplane 11. Optionally, the reflective sheet 19 can be made of plastic material, for example, polyethylene terephthalate (PET), polycarbonate (PC), polystyrene (PS) and the like. The reflective sheet 19 may also comprise a highly reflective coating applied to a plastic material, such as titanium dioxide $TiO_2$, to increase the light reflectance. The reflective sheet 19 can reflect the light reflected from the optical assembly 18 to the backplane 11 to the optical assembly 18 again, so as to improve the light output efficiency of the backlight module 1 and finally enhance the brightness of the backlight of the backlight module 1.

In some embodiments, the backlight module 1 further comprises a lamp panel (not shown in the figures) provided on the backplane 11, an optical assembly 18 located on a side of the lamp panel away from the backplane 11, and an orthographic projection of the conductive sheet 13 on the corresponding side wall 113 and an orthographic projection of the optical assembly 18 on the side wall 113 at least partially overlap.

Optionally, the backlight module 1 is a direct type backlight module 1, and the lamp panel comprises a circuit board and a plurality of light emitting elements provided on the circuit board and distributed in a rectangular array. The optical assembly 18 is located on a side away from the backplane 11 of the lamp panel, an orthographic projection of the conductive sheet 13 on the corresponding side wall 113 at least partially overlaps with an orthographic projection of the optical assembly 18 on the side wall 113, so that particles and impurities generated during the assembly or use of the optical assembly 18 or the lamp panel are all in the electric field and can be adsorbed on the conductive sheet 13.

Optionally, the light emitting element may be any one of micro light emitting diodes (Micro-LED) or submillimeter light emitting diodes (Mini-LED). Micro-LED refers to LED chips with a grain size of less than 100 microns, and Mini-LED refers to LED chips with a grain size of about 100 to 300 microns. In other embodiments, the light-emitting element can also be a regular-sized light-emitting diode (LED), whereas LED, Mini-LED or Micro-LED can be used as a self-luminous light-emitting element for display, with low power consumption, high brightness, high resolution, high color saturation, fast response, long life, high efficiency and other advantages.

Further, the optical assembly 18 may comprise a diffuser plate and an optical film located on a side of the diffuser plate away from the backplane 11, the diffuser plate is used to diffuse the light emitted by the light-emitting elements to balance the brightness of the entire backlight module 1. The optical film may comprise, for example, a prism sheet, a protective sheet, etc. The prism sheet is used to control the propagation direction of the light diffused by the diffusion plate, so that the propagation direction of the light is perpendicular to the liquid crystal display panel 2. The protective sheet is used to protect the prisms of the prism sheet from scratches and the like. The protective sheet can also be used to widen the viewing angle that was previously narrowed by the prism sheet. The diffuser plate and the optical film are fixedly connected by transparent optical glue to prevent the relative displacement between the diffuser plate and the optical film from affecting the light emitting effect of the backlight module 1.

In addition, a reflective sheet 19 is also provided between the lamp panel and the backplane 11. Optionally, the reflective sheet 19 can be made of plastic material, for example, polyethylene terephthalate (PET), polycarbonate (PC), polystyrene (PS) and the like. The reflective sheet 19 may also comprise a highly reflective coating applied to a plastic material, such as titanium dioxide $TiO_2$, to increase the light reflectance. The reflective sheet 19 can reflect the light reflected from the optical assembly 18 to the backplane 11 to the optical assembly 18 again, so as to improve the light output efficiency of the backlight module 1 and finally enhance the brightness of the backlight of the backlight module 1.

Second Embodiment

Figure 5:
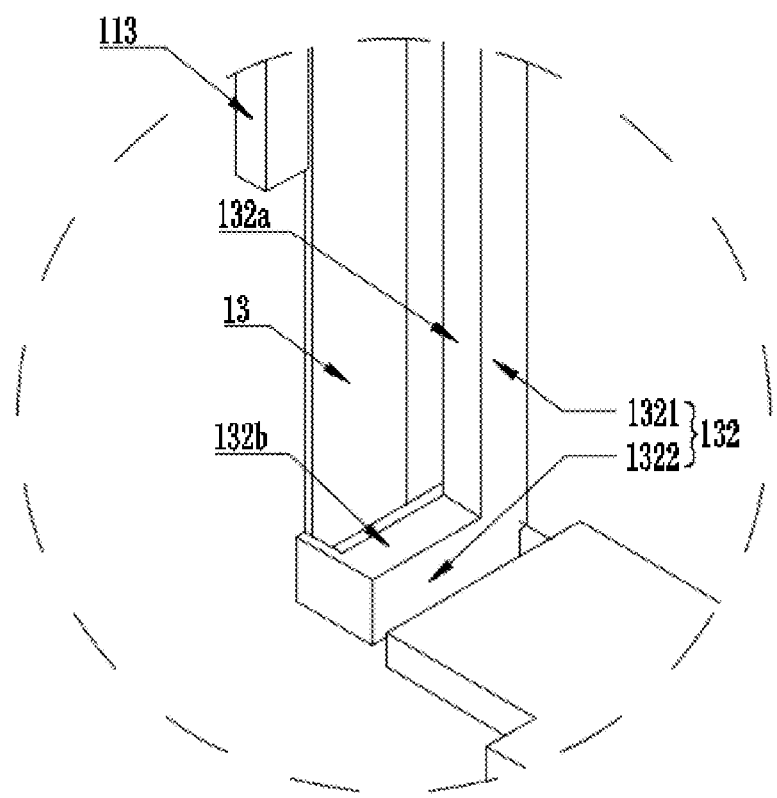
FIG. 5 shows a partial three-dimensional structural schematic diagram along an angle of a backlight module provided by a second embodiment of the present disclosure.
Figure 6:
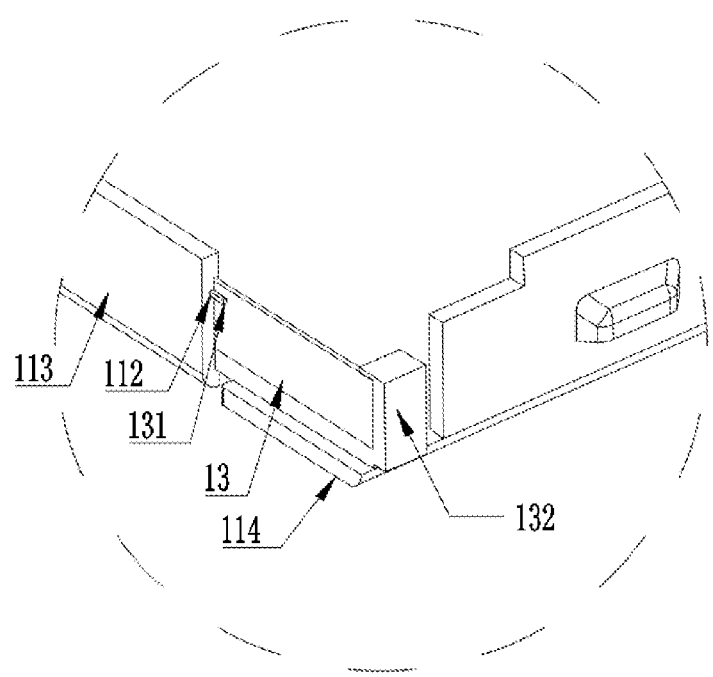
FIG. 6 shows a partial three-dimensional structural schematic diagram along another angle of the backlight module shown in FIG. 5.
Figure 7:
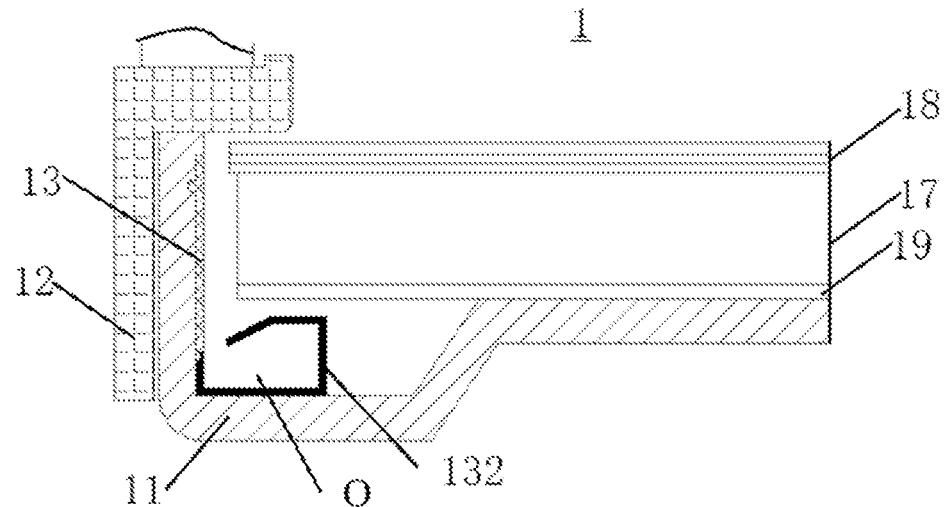
FIG. 7 shows a longitudinal cross-sectional structural schematic diagram of the backlight module shown in FIG. 6.
Figure 8:
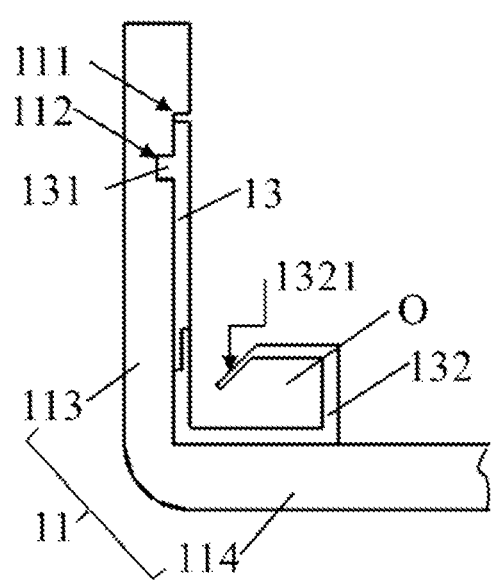
FIG. 8 shows an enlarged structural schematic diagram of a conductive sheet and a storage box shown in FIG. 7.

FIG. 5 shows a partial three-dimensional structural schematic view of the backlight module along one angle provided by a second embodiment of the present disclosure; FIG. 6 shows a partial three-dimensional structural schematic view of the backlight module along another angle shown in FIG. 5; FIG. 7 shows a longitudinal cross-sectional structural schematic diagram of the backlight module in FIG. 6; FIG. 8 is an enlarged structural schematic diagram of the conductive sheet and the storage box shown in FIG. 7.

As shown in FIGS. 5 to 8, the second embodiment of the present disclosure provides a backlight module 1, which is similar in structure to the backlight module 1 provided in the first embodiment, except that it further comprises a storage box 132. The backplane 11 further comprises a bottom wall 114 connected with the side wall 113, and the storage box 132 covers a side of the conductive sheet 13 extending along its own length direction and facing the bottom wall 114 and at least one end of the conductive sheet 13 extending along its own length direction, used to collect the foreign matter falling off from the conductive sheet 13.

Specifically, as mentioned above, after the backlight module 1 and the liquid crystal display panel are assembled into a display device product, the two conductive sheets 13 are respectively electrically connected with the power supply module on the main board. During the use of the display device, it can continuously and stably absorb foreign matter such as dust, and prevent the foreign matter from scratching the optical assembly 18.

Wherein, the material of storage box 132 is selected as insulating material, for example, rubber, polyvinyl chloride etc., since the integral structure constituted by the storage box 132 and one of the conductive sheets 13 is not symmetrical with the other one of the conductive sheets 13, the storage box 132 is made of an insulating material, on one hand the backplane 11 is prevented from being charged, when the backplane 11 is charged, some dust will be caused to accumulate on the backplane 11, on the other hand if the storage box 132 is made of an un-insulating material, some dust will be adsorbed on the surface of the storage box 132. Meanwhile, the storage box 132 will cause the shape of the two conductors (the overall structure formed by the storage box 132 and one of the conductive sheets 13 and the other conductive sheet 13) to be irregular in shape, so as to form an irregular electric field and affect the ability of the electric field.

Herein, for the rectangular backlight module 1, "the length direction of the conductive sheet 13" refers to the direction in which the short side of the backlight module is located. When the backlight module 1 is in normal use, the bottom wall 114 of the backlight module 1 is parallel to the vertical plane, that is, the conductive sheet 13 is in the vertical state shown in FIG. 5, when the storage box 132 covers an end of the conductive sheet 13 extending in its length direction, for example, the lowermost end when the conductive sheet 13 is in a vertical state, foreign matter absorbed from the conductive sheet 13 can be collected at any time when the backlight module is in normal use. In addition, when the backlight module 1 is in the state of assembly or maintenance, the bottom wall 114 of the backlight module 1 is parallel to the horizontal plane, since the storage box 132 further covers an end of the conductive sheet 13 extending in its length direction and facing the bottom 114, the foreign matter falling off from the conductive sheet 13 can also fall into the accommodating cavity O under the action of its own gravity. In addition, the storage box 132 can further cover the other end of the conductive sheet 13 extending along its own length direction, so that the storage box 132 can fully collect the foreign matter falling off from the conductive sheet 13 from all directions, and prevent the foreign matter from abnormal problems such as abnormal noise caused by falling off by vibrating or under the action of its own gravity.

Furthermore, an accommodating cavity O and an opening communicating with the accommodating cavity O is formed between the storage box 132 and the conductive sheet 13, a side of the opening opposite to the conductive sheet 13 is provided with a slope that tapers toward the accommodating cavity O. Optionally, the storage box 132 is a plastic part, such as nylon, etc., which is light in weight.

As shown in FIG. 5, the storage box 132 comprises a first storage portion 1321 extending along the length direction of the conductive sheet 13 and a second storage portion 1322 provided at one end of the conductive sheet 13 in the length direction. The first storage portion 1321 is connected with the second storage portion part 1322, a side of the first storage portion 1321 opposite to the conductive sheet 13 is formed with a first slope 132a, a side of the second storage portion 1322 opposite to the conductive sheet 13 is formed with a second slope 132b, the first slope 132a and the second slope 132b are perpendicular to each other.

In this embodiment, when the backlight module 1 is in normal use, the bottom wall 114 of the backlight module 1 is parallel to the vertical plane, that is, the conductive sheet 13 is in the vertical state shown in FIG. 5. Foreign matter may fall onto the second slope 132b, while the foreign matter may fall into the accommodating cavity O under the action of its own gravity. When the backlight module 1 is in the state of assembly or maintenance, the bottom wall 114 is parallel to the horizontal plane, foreign matter falling off from the conductive sheet 13 may fall onto the first slope 132a, while the foreign matter may also fall into the accommodating cavity O under the action of its own gravity. Such setting can improve the effect of collecting foreign matter of the storage box 132 on the one hand, and on the other hand, can also prevent foreign matter from escaping from the opening of the storage box 132 when subjected to vibration or other external forces, which generates abnormal problems such as abnormal noise inside the backlight module 1.

Furthermore, an adhesive layer is provided on the inner wall of the storage box 132. The adhesive layer can be a double-sided tape, one side of which is adhesively connected with the inner wall of the accommodating cavity O, and the other side is used for bonding the fallen foreign matter, preventing the foreign matter from escaping from the storage box 132, and further improving the foreign matter collecting effect of the storage box 132.

In some embodiments, the storage box 132 is integrally formed with the conductive sheet 13, a side of the conductive sheet 13 facing the side wall 113 is provided with an insulating guiding bar 131 extending along its own length direction, and a side wall 113 of the backplane 11 is correspondingly provided with a second groove 112 slidably connected with the insulating guiding bar 131.

As shown in FIG. 8, the insulating guiding bar 131 can be a plastic part, such as nylon, etc., and it can be integrally formed with the conductive sheet 13 and the storage box 132 via injection molding process. A side wall 113 of the backplane 11 is correspondingly provided with a second groove 112 slidably connected with the insulating guiding bar 131, so that the conductive sheet 13 and the storage box 132 can be pulled out from the side of the backplane 11, which facilitates to assemble or disassemble the conductive sheet 13 while cleaning the foreign matter in the storage box 132, improving the efficiency of assembly or disassembly. In addition, compared with the first embodiment, the insulating layer 15 can further be omitted from the backlight module 1, saving manufacturing cost.

In some embodiments, a side of the storage box 132 facing the bottom wall 114 of the backplane 11 is provided with an insulating guiding bar (not shown in the figure) extending along its length direction, and the bottom wall 114 is correspondingly provided with a second groove (not shown) slidably connected with the insulating guiding bar. Specifically, the storage box 132 and the conductive sheet 13 are separately provided, and the material of the insulating guiding bar and the storage box 132 is the same and can be integrally formed by injection molding. The bottom wall 114 is formed with the second groove cooperating with the insulting guiding bar by means of impact molding for example, so that the storage box 132 can be pulled out from the side of the backplane 11 separately to clean the foreign matter in the storage box 132 without pulling out the conductive sheet 13, avoiding tearing the wire 14 during the pulling out process, causing the electric field for attracting foreign matter cannot be formed between the two conductive sheets 13.

Thus, after the display device has been used for a long time, the storage box 132 can be pulled out from the side of the backplane 11 regularly and the storage box 132 can be cleaned, or the storage box 132 can be cleaned during maintenance, so that the interior of the backlight module 1 maintains a relatively clean environment.

It can be understood that, when the storage box 132 and the conductive sheet 13 are provided separately, the slidable connection design between the conductive sheet 13 and the backplane 11 can be omitted, and the structure and assembly process of the backlight module can be simplified.

In addition, as shown in FIG. 7, for a rectangular backlight module 1, in order to place a storage box 132 on two opposite side walls 113 of the backplane 11, the bottom wall 114 of the backplane 11 corresponds to the storage box 132 are respectively provided with outward protruding protrusions to form a space for accommodating the storage box 132.

Third Embodiment

Figure 9:
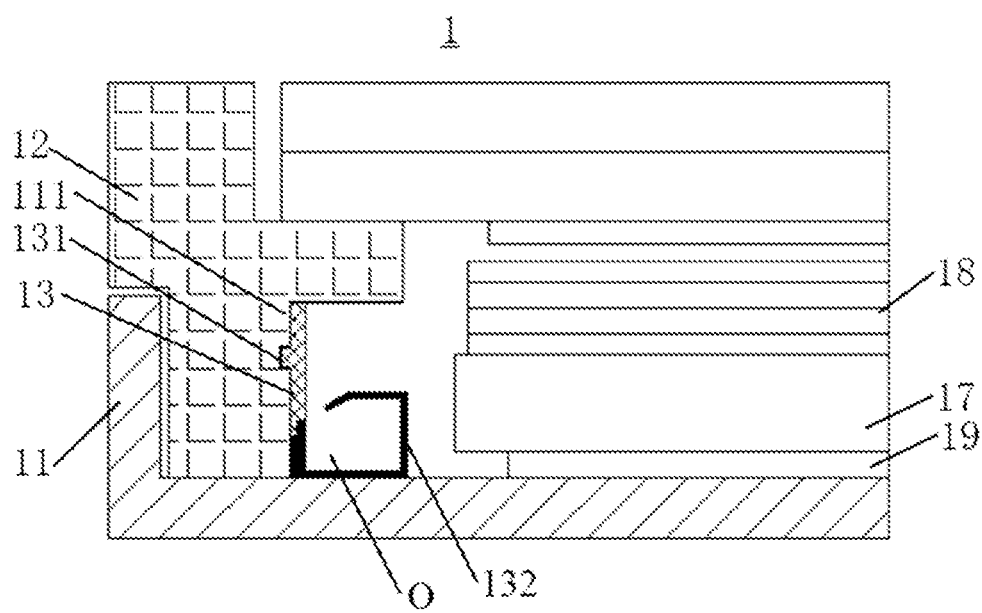
FIG. 9 shows a schematic structural diagram of a backlight module provided by a third embodiment of the present disclosure.

FIG. 9 shows a schematic structural diagram of a backlight module provided by a third embodiment of the present disclosure.

As shown in FIG. 9, the third embodiment of the present disclosure provides a backlight module 1, which is similar in structure to the backlight module 1 provided in the first embodiment or the second embodiment, the difference is that the conductive sheet 13 is provided on the two opposite side walls of the plastic frame 12.

As shown in FIG. 9, the plastic frame 12 is provided around the side walls 113 of the backplane, and the conductive sheets 13 are provided on two opposite side walls of the plastic frame 12. The plastic frame 12 is usually made of plastic material, such as polycarbonate, which has good elasticity. During the transportation and use of the backlight module 1, the plastic frame 12 can provide a good buffer for the structure such as the light emitting assembly and the optical assembly 18, and prevent the structure such as the light emitting assembly and the optical assembly 18 from directly hitting the backplane 11 and being damaged. Optionally, the plastic frame 12 and the backplane 11 can be pasted together by double-sided adhesive tape after being manufactured respectively. Optionally, after the backplane 11 is stamped and formed, it can also be used as an insert and integrally injection-molded with the plastic frame 12.

In one example, as shown in FIG. 9, a first groove 111 is provided on a side wall of the plastic frame 12, a conductive sheet 13 is accommodated in the first groove 111, and an insulating layer 15 is provided between the conductive sheet 13 and the first groove 111. As shown in FIG. 4, a side wall 113 of the backplane 11 is provided with a first groove 111, optionally, the depth of the first groove 111 is 0.3 mm, the thickness of the conductive sheet 13 is 0.2 mm, and the insulating layer 15 provided between the conductive sheet 13 and the first groove 111 has a thickness of 0.1 mm Optionally, the insulating layer 15 is an insulating tape with double-sided tape, one side of the insulating tape is bonded to the bottom of the first groove 111, and the other side is bonded to the conductive sheet 13 to prevent the conductive sheet 13 from being electrically conductive to the backplane 11.

In another example, the backlight module 1 further comprises a storage box 132, the backplane 11 further comprises a bottom wall 114 connected with the side wall 113, the storage box 132 covers a side of the conductive sheet 13 extending along its length direction and facing the bottom wall 114 and at least one end of the conductive sheet 13 extending along its length direction, used to collect foreign matter falling off from the conductive sheet 13.

Furthermore, an accommodating cavity O and an opening communicating with the accommodating cavity O are formed between the storage box 132 and the conductive sheet 13, and a slope that tapers toward the accommodating cavity O is provided on a side of the opening opposite to the conductive sheet 13. Optionally, the storage box 132 is a plastic part, such as nylon, etc., which is light in weight.

Furthermore, an adhesive layer is provided on the inner wall of the storage box 132. The adhesive layer can be a double-sided tape, one side of which is adhesively connected with the inner wall of the accommodating cavity O, and the other side is used for bonding the fallen foreign matter, preventing the foreign matter from flowing out of the storage box 132, and further improving the collection effect of foreign matter of the storage box 132.

In some embodiments, the storage box 132 is integrally formed with the conductive sheet 13, and one side of the conductive sheet 13 facing the side wall of the plastic frame 12 is provided with an insulating guiding bar 131 extending along its own length, the side wall of the plastic frame 12 is correspondingly provided with a second groove 112 slidably connected with the insulating guiding bar 131, so that the conductive sheet 13 is slidably connected with the backplane 11.

In some embodiments, a side of the storage box 132 facing the bottom wall 114 of the backplane 11 is provided with an insulating guiding bar (not shown in the figure) extending along its length direction, and the bottom wall 114 is correspondingly provided with a second groove (not shown) slidably connected with the insulating guiding bar. Specifically, the storage box 132 and the conductive sheet 13 are provided separately, and the material of the insulating guiding bar and the storage box 132 is the same and can be integrally formed by injection molding. The bottom wall 144 is formed with a second groove cooperating with the insulting guiding bar by means of impact molding for example, so that the storage box 132 can be pulled out from the side of the backplane 11 separately to clean the foreign matter in the storage box 132 without pulling out the conductive sheet 13, so as to avoid tearing the wire 14 during the pulling out process causing an electric field for attracting foreign matter cannot be formed between the two conductive sheets 13.

In addition, as shown in FIG. 9, for a rectangular backlight module 1, in order to place the storage box 132 at the two opposite side walls of the plastic frame 12, a space for accommodating the storage box 132 is formed between the first groove 111 of the plastic frame 12 and the optical assembly 18, the light guiding plate 17, the reflective sheet 19 and other assemblies.

Moreover, an embodiment of the present disclosure also provides a display device, comprising the backlight module 1 and the liquid crystal display panel 2 as mentioned above, the backlight module 1 is provided on the backlight side of the liquid crystal display panel 2 and is used to provide a light source for the liquid crystal display panel 2.

The liquid crystal display panel 2 can be a single display panel, or a double display panel stacked in the thickness direction. When the liquid crystal display panel 2 is a double display panel, the display panel located on the bottom layer is used for controlling light, and the display panel located on the top layer is used for displaying. Such setting can improve the contrast ratio of the display device.

The liquid crystal display panel 2 comprises an array substrate, a color film substrate arranged opposite to the array substrate and a liquid crystal layer arranged between the array substrate and the color film substrate. The liquid crystal layer comprises multiple liquid crystal molecules, which are usually rod-shaped and can both flow like a liquid and have certain crystalline characteristics. When liquid crystal molecules are exposed to an electric field, their orientation changes according to the electric field. The liquid crystal display panel 2 controls the rotation of liquid crystal molecules in the liquid crystal layer by applying driving voltage on the array substrate and color film substrate to refract the light provided by the backlight module 1 to produce a picture.

It can be understood that the technical solution of the backlight module 1 provided by various embodiments of the present disclosure can be widely used to provide light sources for various liquid crystal display panels, such as TN (Twisted Nematic, twisted nematic type) display panels, IPS (In-Plane Switching, plane switching type) display panel, VA (Vertical Alignment, vertical alignment type) display panel, MVA (Multi-Domain Vertical Alignment, multi-quadrant vertical alignment type) display panel.

It should be readily understood that "on", "above" and "over" in this disclosure should be interpreted in the broadest manner such that "on" means not only "directly on something", also comprises the meaning of "on something" with intermediate features or layers in between, and "above" or "over" not only comprises "on something" or "above something", may also comprise the meaning of "above" or "over" without intervening features or layers (ie, directly on something).

The term "layer" as used herein may refer to a portion of material comprising a region having a certain thickness. A layer may extend over the entirety of the underlying or overlying structure, or may have an extent that is less than the extent of the underlying or overlying structure. Furthermore, a layer may be a region of a homogeneous or non-homogeneous continuous structure having a thickness less than the thickness of the continuous structure. For example, a layer may be located between the top and bottom surfaces of the continuous structure or between any pair of transverse planes at the top and bottom surfaces. Layers may extend laterally, vertically and/or along the tapered surface. Substrate may be a layer, may comprise one or more layers therein, and/or may have one or more layers located thereon, above, and/or below. Layers may comprise multiple layers. For example, interconnect layers may comprise one or more conductor and contact layers (in which contacts, interconnect lines, and/or vias are formed) and one or more dielectric layers.

Finally, it should be noted that the above embodiments are only used to illustrate the technical solutions of the present disclosure, and are not intended to limit it; although the disclosure has been described in detail with reference to the foregoing embodiments, those of ordinary skilled in the art should understand that it is still possible to modify the technical solutions described in the foregoing embodiments, or perform equivalent replacements for some or all of the technical features; and these modifications or replacements do not make the essence of the corresponding technical solutions deviate from the range of technical solutions of the various embodiments of the present disclosure.

What is claimed is:

1. A backlight module, comprising:
a backplane and a plastic frame provided around a side wall of the backplane, wherein two side walls opposite to the backplane or opposite to the plastic frame are respectively provided with a conductive sheet to form an electric field for attracting foreign matter between the two conductive sheets; and
wherein the backlight module further comprises a storage box, the backplane further comprises a bottom wall connected with the side wall, the storage box covers a side of the conductive sheet extending along its length direction and facing the bottom wall and at least one end of the conductive sheet extending along its length direction and is configured to collect foreign matter falling off from the conductive sheet.

2. The backlight module of claim 1, wherein a first groove is provided on the backplane or the side wall of the plastic frame, the conductive sheet is accommodated in the first groove, and an insulating layer is provided between the conductive sheet and the first groove.

3. The backlight module according to claim 1, wherein an accommodating cavity and an opening communicating with the accommodating cavity are formed between the storage box and the conductive sheet, and one side of the opening opposite to the conductive sheet is provided with a slope tapered toward the accommodating cavity.

4. The backlight module according to claim 3, wherein an adhesive layer is provided on an inner wall of the storage box.

5. The backlight module according to claim 1, wherein the storage box is integrally formed with the conductive sheet, a side of the conductive sheet facing the side wall is provided with an insulating guiding bar extending along its length direction, a second groove slidably connected with the insulating guiding bar is correspondingly provided on the backplane or the side wall of the plastic frame.

6. The backlight module according to claim 1, wherein a side of the storage box facing the bottom wall of the backplane is provided with an insulating guiding bar extending along its length direction, and the bottom wall is correspondingly provided with a second groove slidably connected with the insulating guiding bar.

7. The backlight module according to claim 1, wherein the backlight module further comprises a light guiding plate, a light bar on one side of the light guiding plate, and an optical assembly on a side of the light guiding plate away from the backplane, the light bar and the conductive sheet are located on different side walls of the backplane or the plastic frame, and an orthographic projection of the conductive sheet on the corresponding side wall at least partially overlaps with an orthographic projection of the optical assembly on the side wall.

8. The backlight module according to claim 1, wherein the backlight module further comprises a lamp panel provided on the backplane and an optical assembly located on a side of the lamp panel away from the backplane, an orthographic projection of the conductive sheet on the corresponding side wall at least partially overlaps with an orthographic projection of the optical assembly on the side wall.

9. The backlight module according to claim 2, wherein the insulating layer is an insulating tape with double-sided adhesive tape, one side of the insulating tape is bonded to the bottom of the first groove, and the other side is bonded to the conductive sheet.

10. The backlight module according to claim 3, wherein the storage box comprises a first storage portion extending along the length direction of the conductive sheet and a second storage portion provided at one end of the conductive sheet in the length direction, the first storage portion is connected with the second storage portion, a first slope is formed on a side of the first storage portion opposite to the conductive sheet, and second slope is formed on a side of the second storage portion opposite to the conductive sheet, the first slope and the second slope are perpendicular to each other.

11. The backlight module according to claim 1, wherein the conductive sheet is provided on two opposite side walls of the backplane, and the bottom wall of the backplane is respectively provided with outwardly outward protruding protrusions corresponding to the storage box to form a space for accommodating the storage box.

12. The backlight module according to claim 1, wherein either one of the two conductive sheets is electrically connected with the positive terminal of the power module via a wire, and the other one is electrically connected with the positive terminal of the power module via a wire, so as to form an electric field for absorbing foreign matter between the two conductive sheets.

13. The backlight module according to claim 12, wherein the backplane further comprises a bottom wall connected with the side wall, and the bottom wall is provided with a through hole allowing the wire to pass through.

14. A display device comprising:
 liquid crystal display panel; and
 a backlight module provided on the backlight side of the liquid crystal display panel and configured to provide a light source for the liquid crystal display panel; wherein the backlight module comprises a backplane and a plastic frame provided around the side wall of the backplane, wherein two opposite side walls of the backplane or the plastic frame are respectively provided with conductive sheets insulated from the backplane, so as to form an electric field for absorbing foreign matter between the two conductive sheets; and
 wherein the backlight module further comprises a storage box, the backplane further comprises a bottom wall connected with the side wall, the storage box covers a side of the conductive sheet extending along its length direction and facing the bottom wall and at least one end of the conductive sheet extending along its length direction and is configured to collect foreign matter falling off from the conductive sheet.

\* \* \* \* \*